United States Patent [19]

Gadhok

[11] Patent Number: 4,732,440
[45] Date of Patent: Mar. 22, 1988

[54] SELF RESONANT SCANNING DEVICE

[76] Inventor: Jagmohan S. Gadhok, 1520 Belmont South, Arlington Heights, Ill. 60005

[21] Appl. No.: 790,134

[22] Filed: Oct. 22, 1985

[51] Int. Cl.[4] .............................................. G02B 26/08
[52] U.S. Cl. .................................................... 350/6.6
[58] Field of Search ........................ 350/6.6, 487, 637

[56] References Cited

U.S. PATENT DOCUMENTS

| 3,519,336 | 7/1970 | Russell | 350/637 |
| 3,532,408 | 10/1970 | Dostal | 350/6.6 |
| 3,612,642 | 10/1971 | Dostal | 350/6.6 |
| 4,421,381 | 12/1983 | Ueda et al. | 350/6.6 |

FOREIGN PATENT DOCUMENTS 489543  7/1938  United Kingdom ................ 350/487

Primary Examiner—John K. Corbin
Assistant Examiner—Vincent J. Lemmo

[57] ABSTRACT

This invention pertains to an improved scanning device which uses a S shaped flexure (S-flex). The use of the S-flexures in opposition provides a very rigid structure that is significantly lower in cross axial error displacement and also halves the radius of gyration which in turn provides for highly accurate scans at very high resonant frequencies. The resonant scanner also can have high levels of deflection with minimal wobble which opens new areas of use. This scanner is without bearings and the stress loads on the spring members are significantly lower than previously available at the same accuracy level and the shape of the S-flex members readily lends to attachment of mirrors or other scanning devices. Improvements in the index of performance of 5 to 20 times the performance of currently available scanners are possible with the invention.

25 Claims, 15 Drawing Figures

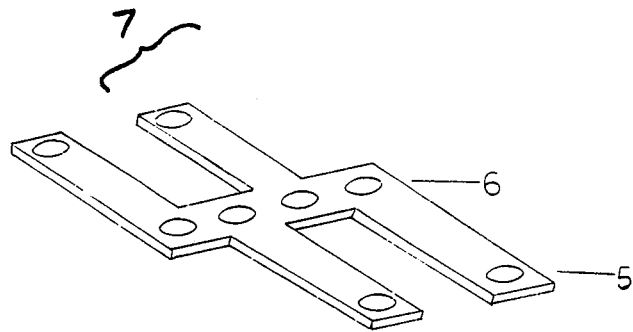
FIG 3A
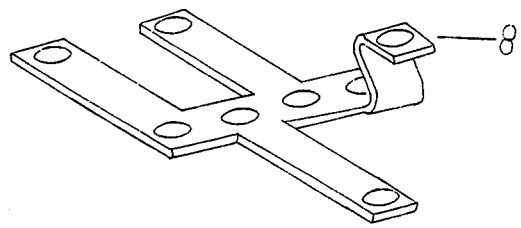
FIG 3B
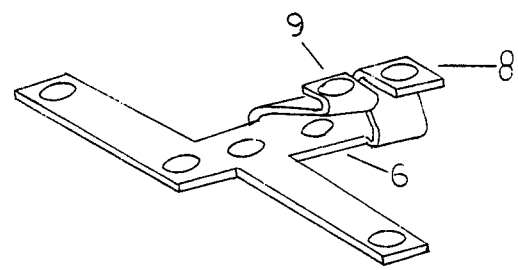
FIG 3C
FIG 3

SELF RESONANT SCANNING DEVICE

FIELD OF INVENTION

This invention referrs to self resonant scanning devices often used in laser scanning equipment.

DESCRIPTION OF DRAWINGS

FIG. 3 Shows the steps in the assembly of the S-flex unit from the spring blank an FIG. 3A where each leg or projection (5) from the central connecting member (6) is a flattened spring and the combination of the two opposing projections becomes a flat opposed S-flex (7). In FIG. 3B the first leg of the spring assembly is formed by doubly bending the projecting part (8). In FIG. 3C the second part of the S-flex is formed by doubly bending the other projecting leg of the opposed pair (9) connected by a common portion of the central connecting member (6).

Figure 1:
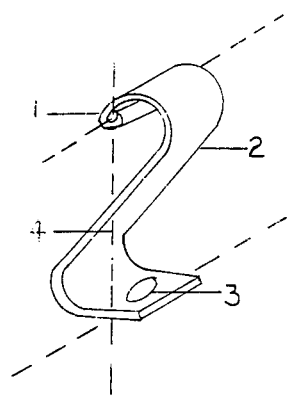
FIG. 1 shows a S-flex shaped spring (2) with a rolled circular segment at the top (1) and a flat attachment tab complete with a hole for attachment by a rivet (3) at the bottom. The center of gyration of the S-flex member is indicated by (4).
Figure 2:
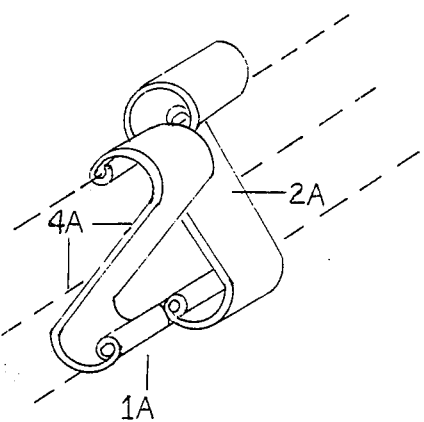
FIG. 2 shows a pair of the S-flex springs with the rolled cylinder segment for pin attachment at the top and the bottom (1A) with the center of gyration of the S-Flex springs (2A) indicated by the axis (4A).
Figure 4:
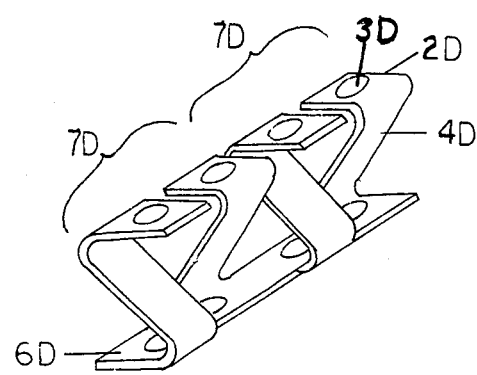
FIG. 4 shows the fully formed part with two opposed pairs of the S-flex structure (7D) attached at the base by a common connecting member (6D). The flat connecting tabs with a rivet hole (3D) are now aligned at the top of the spring elements (2D) and the axis of gyration runs through (4D).
Figure 5:
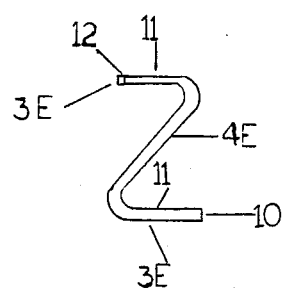
FIG. 5 shows a side view of a S-flex unit with the spring effective length shown by a dotted line (10). The attachment tabs (3E) contribute to the spring length up to the point of attachment which is the rivet hole (11) while a short distance beyond the hole (12) does not participate in the spring length. The axis of gyration runs through point (4E).

The parts are identified as in FIG. 5 and the symbols used in the text appended.

Figure 12:
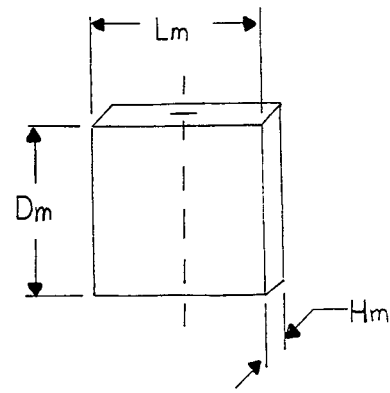

FIG. 12 shows the mirror with key dimensions used in calculations identified. The mirror is Dm long, Lm wide and has a thickness of Hm.

Figure 6:
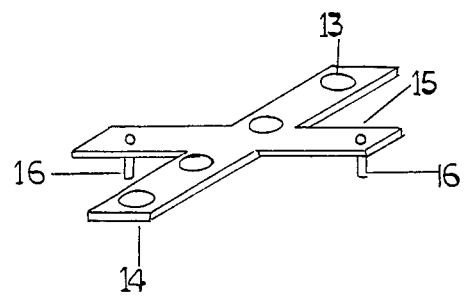
FIG. 6 shows a mirror attachment base unit with 4 rivet holes arrayed to match the holes in the flat tabs of the S-flex (13), the holes are in an attachment central member (14). The central member has a projecting cross member (15) at right angles and centrally located along the central member. The iron pins (16) are located at the ends of the cross member where they project and the pins are magnitized.
Figure 7:
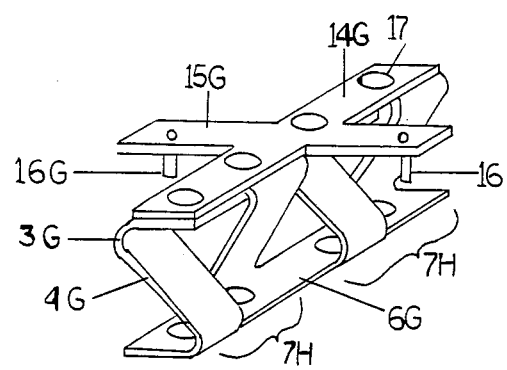
FIG. 7 shows the combination of the S-Flex spring assembly shown in FIG. 4 with the mirror attachment base shown in FIG. 6. The mirror attachment consists of the central member (14G) attached to the tabs (3G) in the S-flex spring assembly by rivets (17). The cross member of the mirror attachment (15G) is arranged with the iron pins (16G) pointed towards the base of the S-flex connecting member. The S-flex unit consisting of two sets of opposed S-flex springs (7H) with the common central connecting member at the bottom (6G). The axis of gyration of the entire assembly is an axis through point (4G) parellel to the base commecting member.
Figure 8:
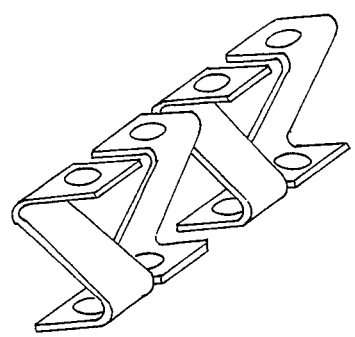
FIG. 8 shows the array of S-flex springs as shown in FIG. 4 made of individually formed springs without the connecting member.
Figure 13:
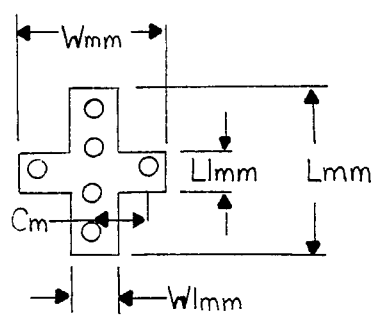
Figure 13:
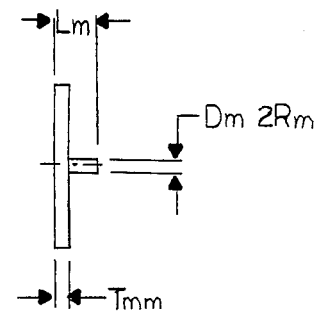

FIG. 13 shows the mirror attachment base as in FIG. 6 with the calculation dimensions indicated.

BACKGROUND

The use of scanners is becoming ever more important with the high speed printers, optical storage devices, and bar code readers all using a scanning device in conjunction with a beam of electromagnetic radiation to transform electronic signals between computer memories and printed copy and visa versa. The scanners are required to scan a beam of light by moving a mirror to illuminate a small discrete portion of a document or to pulse light along a defined path. This controlled motion of a mirror surface has become a major element in modern computerized data systems.

Typical uses of the scanners has also expanded into phototype setting, printing, laser cameras, resistor trimming, computer output microfilming, laser scanning microscopes microchip lithographics and the list of uses is steadily growing.

The industry to provide this scanning device has also grown from a few thousand units in 1980 to a current level in excess of 100,000 units per year. While the growth rate has dropped it is still expanding dramatically.

CURRENT PRACTICE

Mirror devices are used for scanning where beams of electromagnetic radiation are deflected in a predetermined manner by excitation of the mirror in various planes. This allows a narrow beam to be deflected to cover a wide arc. Large deflection angles and very rapid deflection speed are critical to the effective use of the devices which employ the scanners as is the accuracy of the scan. It is the combination of these three atributes that define the technical limits to many processes.

Commercially available deflectors for large deflection angles and high resonant angles are sensitive to machine and external vibrations. These devices employ torsion bars and flexural members, leaf springs or bearings.

Torsion bar scanner designs consist of a thin rod which in the basic design is held at one end and has a mirror attached at the other end. The drive motor excites the mirror to move in a resonant manner by twisting the rod, typically through electromagnetic coupling. Several improvements to these designs have been made with the torsion rod clamped at both ends and the mirror centrally located on the free length of the torsion rod. Further improvements resulted from the tensile loading of the torsion rod in the direction of the length of the rod. This device maintains a high wobble (cross axis displacement) that is independent of the frequency. The unit has wobble of 5 to 10 microradians in the best units and can be as high as 20 microradians. The unit has a place in ultra high frequency applications (over 1,000 hertz and more frequently 3,000 to 4,000 hertz). Since the deflector must move freely the pivot points must be lightly restrained, in some cases bearings are used but this provides minor improvements. Bearings may be used to improve accuracy in the rod and other devices but where ever bearings are used wear of the bearings becomes a problem. In these high resolution scans the placement or accuracy of the beam is critical since any deviation causes errors in the output. The errors would prevent good reproduction of the original in the case of a printer or would cause errors due to inexact alignment of the scanned areas. The cross axis error causes the beam of a laser which is being deflected by the scanner mirror to wander.

Taut band scanners consist of a rectangular band of material streched between two points. Mirror and drive are attached to the taut band and the deflection of the band deflects the centrally mounted mirror. This type scanner is useful for wide deflection anglse with 30 degree deflections possible. The main problem is ponderous speeds at the high deflections with 10 to 24 hertz ranges representing the available technology. At the other end of the speed spectrum the angle of deflection is restricted drastically with 2 degrees (Mechanical) typical limits on a 600 to 800 hertx scanner design. The cross axis wobble of these scanners also is typically 10 microradians.

As noted the use of bearings is another way to support an oscillating member and could be used to form a scanner. The basic problem is the balls need some freedom of motion to roll and the result is a scanner with a 50 microradian cross axis wobble. An additional reason precluding the use of bearings as scanners is that the ball bearing supports have limited bearing life due to the rapid sliding of the balls in bearing races at high resonant frequencies. The travel of the bearings is also limited in many cases to a back and forth motion by the rapid oscillation of the scanner which again adds to the wear problem. Bearings are used to stabilize some scanners deflection but the result is not as good as the cross flexures and the life limitation severely limits the commercial use of the bearing stabilized deflectors. These problems are much worse as the resonant frequency of the scanner is increased.

Yet another way to make a scanner is to employ leaf springs. These springs, attached to both sides of a mirror assembly are cantilevered strips of metalmounted at right angles to the plane of the mirror. Relying on bending stresses these are the most limited of the designs with sensitivity to the effect of gravity and poor accuracy.

Cross flex members have been used in some scanner applications such as the ISX from General Scanning Inc, a Massachusetts company. The construction used consists of straight spring elements clamped at the top and the bottom. The attachment means adds inertia and since the spring is straight the attachment is at a maximum distance thus the radius of gyration is high. The high inertia cuts the resonant frequency for a given scanner configuration. When the high inertia is unbalanced it causes shaking forces to be applied to the scanner. The General Scanner models use thickness variations within the straight sections to enhance the strength of the springs at the clamp points where the metal is thickest and then reduce the metal thickness to as little as 50% of the thickness at the clamping point. The straight springs tend to transmit incident vibrations easily to the scanner. The problems with the straight cross flex scanners result in a practical limit of the resonant frequency to around 250 hertz as a result of the height of the unit increasing as the length of the spring increases. The result of this is that the mass of the mirror, mirror support and the drive are multiplied times the square of the radius of gyration in determining the moment of inertia so at the higher resonant frequencies which would indicate longer springs, a point of diminishing returns is rapidly reached.

Despite the performance problems, the cross flex member concept is attractive due to the higher stability of the deflectors to the cross axis wobble for wide angle scanners even under external vibrations. The limits of frequency are however troublesome.

To achive indefinite spring life at large deflection angles, the spring length is determined by the endurance limit stress allowed in the material. While better materials are one solution, this type of improvement is limited and unlikely to be achived without a major materials breakthrough. The longer lenths of a given spring material have a lower stress for a given deflection. Countering the lowered stress is the higher inertia of the oscillating member since the radius of gyration is increased. This radius of gyration, defined as the square root of the term (moment of inertia divided by mass), is critical since increases cut the resonant frequency and thus the performance of the scanner. A breakthrough to provide a longer length with low inertial properties was needed.

THE INVENTION

A system of opposing S-flex shapes where the spring is bent in one or more places has been invented to provide a longer spring length with a low inertia that is needed to obtain resonant scanners that have larger deflection angles at higher frequencies.

The S-flex springs have a radius of gyration that is minimized by the forming of the spring into an S or Z shape. While an inverted L shape would also work, the single bend halves the advantage of the lenghtening of the spring and the non symetrical shape causes uneven stress distributions and motion. The curved or flat sections between the top and bottom is part of the spring length up to the point of attachment and since this length participates in the flexure, the flexural length is greatly expanded. The expanded length reduces the stress on the spring at a given deflection and the reduction is obtained without increasing the radius of gyration of the oscillating member. The S-flex configuration, by lending itself to the low inertia attachment of a deflector mirror to the base permits higher resonant frequencies of the scanner.

A single S-flex spring while it accomplishes many of the improvements noted still is deficient in that the radius of gyration is twice the height of the radius of gyration of the opposing s-flex system, this height being the distance from the axis of rotation to the center of gravity of the mirror. In the opposed set of S-flex springs, refered to as the S-flex, the radius of gyration is the axis of the points where the opposed springs cross each other.

In this invention a plurality of the S-flex springs arrayed in opposition resolves the deficiencies seen in the single spring. This also gives a high degree of cross axis placement accuracy and nearly eliminates sensitivity to external vibrations. The S shaped springs placed in opposition act like a torsion spring. Placing them in opposition provides lower radius of gyration. By opposing them a discrete structure is formed which provides added stiffness in the cross axis direction, The s-flex curve allows much higher resonant frequencies from cross flexural type designs.

A second problem that plagues the scanner industry is the attachment of the deflecting device to the spring menbers. The s-flex, unlike other forms of the oscillating members, lends itself to the attachment at both top and bottom. The top of the S shape is a tab which may be attached to the mirror base in a variety of ways. Rivets, spot welds, screws or a variety of other attachment means are easily installed without weakening the part. Adhesives have considerable area of contact which makes these light weight attachments possible. In a like manner the large base area can be attached with rivets, or any other fastening method.

One unique method of attachment, pins can be employed by further forming a cylindrical tube at the end of the S or Z shape. In this tubular attachment is fitted a pin that attaches the spring member to the base or the mirror. This type of attachment can be employed to squeeze a little more length out of a flexure in cases where the space is limited.

These easy attachment methods contrast with the use of bulky clamps in many of the current scanners using flexures where the avoidance of stress concentrations is of paramount importance.

An additional advantage of the curved springs is a lower value of the factor usually designated as q. This number q which is a measure of the sharpness of the resonant curve of the scanner is important since a sharp curve requires higher accuracy in the drive circuits since small drive deviations cause large drops in the motion of the scanning mirror. The S-flex opposed curved springs have been tested at half the q value of an equilivent scanner employing straight springs.

The general discussion of the S-flex spring arrangement has covered the advantages in a simplified way. A performance index is used to quantify the performance of the several types of flexures and pivoting devices on the market and to show the differences between these devices in a way that is meaningful to a user of scanning devices. By defining the performance index as the degree of angular deflection times the resonant frequency divided by the cross axis deflection, a single number is developed for any system that weighs the key factors in the unit performance. The angular optical deflection of the scanner is a measure of the amount that can be seen in a given set of conditions. A scanner with twice the deflection would examine twice the area with each scan if the distsnces between the scanner and the target were the same. Resonant deflection is listed in the formula as theta ($\theta$) and is measured in degrees of deflection peak to peak. The frequency (F) of the unit is measured at the resonant point and expressed in hertz, cycles per second. Higher frequencies could cover more area or could cover the same area in more detail. The cross axis deflection which is sometimes called wobble is an indicator of the quality of the unit with the smaller cross axis wobble giving an indication that the scan would more nearly cover the exact same area in each scan. The cross axis deflection is expressed in arc seconds and in the formula is represented by D.

The performance index is thus $(\theta \times F)/D$. It is illustrative to show the performance indices of some of the existing scanning units now in the marketplace. The numbers are presented in the following table:

| Deflection angle ($\Theta$) in degrees | Frequency in Hertz (F) | Cross axis deflection | Manufacturer & model | PERFORMANCE INDEX |
|---|---|---|---|---|
| 30 | 3000 | 5 | Gen Scanning | 18,000 |
| 30 | 3937 | 5 | Gen Scanning Model IFX | 23,622 |
| 40# | 250 | 0.5 | Gen Scanning Model ISX | 20,000 |
| 30* | 100 | 10 | Gen Scanning Model IPC 1510 | 300 |
| 30* | 100 | 0.5 | Gen Scanning | 6,000 |
| 30* | 100 | 0.5 | Laser Scanning Products Inc URS 100 | 6,000 |
| 40# | 625 | 0.5 | Laser Scanning URS 625 | 50,000 |

*these units are direct replacements
these units represent the limits of cross flexure designs In light of the performance index numbers the importance of the S-flex design in providing greater scan stability at higher frequencies is clear. The higher frequency devices permit faster scan rates or more scans per unit length per second. Without improvements in wobble the higher rates would just increase the error but the combination of high deflection angle which cuts the distance from the scanner to the object for a given linear scan length, high frequencies and the higher accuracy of low cross axis wobble are a synergistic combination that provides for greater clarity in a scan reproduction or faster scans at a given cross axis placement accuracy (error rate). The increase of frequency to 625 hertz is significant for scan speeds and opens new application areas. Especially notable is that while the URS series is much better than the IPC type with cantilevered springs they are in the same price range reflecting greater cost effectiveness of the bent spring technology. The other direct comparison is the 100 hertz ISX with the 100 hertz URS. While the performance index is the same, the ISX is much more expensive due to the elaborate and expensive clamping devices involved in the construction of the ISX.

Having looked at the accuracy of the S-flex flexure, there are several other features that are worth noting. The compact nature of this device is unusual and is a direct result of the spring efficiency, The ease of attachment of the S-flex at both ends and the improvement in the radius of gyration are also notable as is the wide resonance response curve.

An additional benefit of this type of flexure is its adaptability to many differing requirements. The simplicity of the spring concept and the ability to vary the mass, the radius of gyration and the deflection angles gives the device a potential for many specialized uses. Reasons for this flexability and for the high preformance and accuracy should be examined by looking at the calculations involved in the tuning of the device and its adaptation to special requirements.

The calculations for the S-flex scanner are shown in a step by step manner for each element of the scanning unit. A major advantage of this invention is related to the ease of making the S-flex springs. With this type of spring it is relatively easy to change the parameters of the flexure to customize a unit for many specialized uses. With these basic calculations the resonant frequency can be varied by modifications in the spring, by changing the mass of the mirror or the mirror support or by adding mass in the form of the iron driving pins. The spring can be made from different materials, it can be wider or longer—the process of designing a scanner that is readily manufacturable is within the control of the designer and there are a wide range of possible changes to give the designer freedoms not previously possible with fixed purchased flexures.

MOMENT OF INERTIA OF S-FLEX SPRING - $I_p$
$w$ = Width of Flex Member $$\rho = \frac{\rho l}{386.4} \quad \frac{\text{Lb Sec}^2}{\text{inch}}$$

Where $\rho l$ = Density of Material of Spring in Lb/in$^3$
Moment of Inertia of Section A About Axis of Rotation: $I_{AO} = \frac{M \times (2A)^2}{12}$ $$= \frac{t \times A \times w \times \rho \times A^2}{3}$$

$$\boxed{I_{AO} = \frac{wt\rho A^3}{3}}$$

Where $t$ = thickness of S-Flex Spring
$\rho$ = density of the material
moment of Inertia of Section C about $O' = MR^2$
$2\theta = 135°$ $$I_{CO'} = \frac{2\pi R \times 135 \times w \times t \times \rho \times R^2}{360}$$

$I_{CO'} = 2.356 \, t \, w \, \rho \, R^3$

Where $R$ is inside bend Radius of the Spring in inches.
Let $D = O'G$ $$O'G = \frac{R \sin \theta}{\theta} = \frac{R \sin 135/2}{\left[\frac{\pi}{180} \times \frac{135}{2}\right]} = .784 \, R$$

$D = .784 \, R$.

$I_{cg} = I_{CO} - MD^2$
$= 2.356 \, t \, w \, \rho \, R^3 - 2.356 \, t \, w \, \rho \, R \, (.784 \, R^2)$
$I_{cg} = .908 \, t \, w \, \rho \, R^3$
To Calculate $OO'$ $\tan \psi = \frac{R}{A}$ $\psi = \tan^{-1} \frac{R}{A}$ $\phi = 45° - \psi$ $\frac{A}{OO'} = \cos \psi$ $OO' = \frac{A}{\cos \psi}$ $XO' = OO' \sin \phi = B$
$YO' = OO' \cos \phi$ $Xgo' = O'G \sin \theta = \frac{R \sin \theta}{\theta} \cdot \sin \theta = \frac{R \sin^2 \theta}{\theta}$ $Ygo' = O'G \cos \phi = \frac{R \sin \theta}{\theta} \cdot \cos \phi$ -continued $Xgo = X_{O'} + X_{go'} = OO' \sin \phi + \frac{R \sin^2 \theta}{\theta}$ $Ygo = Y_{O'} + Y_{go'} = OO' \cos \phi + \frac{R \sin \theta \cdot \cos \theta}{\theta}$ $OG = \sqrt{Xgo^2 + Ygo^2}$ or $OG^2 = Xgo^2 + Ygo^2$ $I_{CO} = I_{cg} + M(OG^2)$ $$\boxed{I_{CO} = .908 \, wpt R^3 + 2.356 \, wpRt \, (X go^2 + Y go^2)}$$

Moment of Inertia of Section B about axis of rotation $I_{BY} = \frac{1}{12} M(2B)^2$ $= \frac{1}{3} MB^2$ $= \frac{1}{3} (Bw'T\rho)B^2$ $I_{BY} = \frac{1.25}{3} wt\rho B^3$ where $w' = 1.25 \, w$ $I_{BO} = I_{BY} + M(OO'\cos \phi + R)^2$ $I_{BO} = \frac{1.25}{3} wt\rho B^3 + 1.25 \, wt\rho \times 2B \, (OO'\cos \phi + R)^2$ $$\boxed{I_{BO} = .417 \, wt\rho B^3 + 2.5 \, wt\rho B \, (OO'\cos\phi + R)^2}$$

$$\boxed{I_p = 4 \, (I_{AO} + 2I_{CO} + 2I_{BO})}$$

Total height of the Flex Spring $FH = [.707(A + R + t/2) + R + t]$
$A = \frac{1}{2}$ Straight portion of the Spring.
$A = \frac{1}{2} (LF - 1.5 \pi \times R)$ Where $LF = \frac{EF \times TET \times t}{2S}$ $EF$ = Modulus of elasticity of Flex Spring in PSI $TET = TETO \times \frac{\pi}{180}$ $TETO$ = Angle of oscillation in Degrees.
$S$ = Flex Spring Endurance limit stress in PSI
MOMENT INERTIA OF THE MIRROR
Mirror Size = 25 mm × 26 mm × 1 mm
= .984" × 1.023" × .039"
= $Lm \times Dm \times Hm$ $I_{MY} = M \left( \frac{Lm^2 + Hm^2}{12} \right)$ $= Lm \times Dm \times Hm \times \rho m \left( \frac{Lm^2 + Hm^2}{12} \right)$ $$\boxed{I_{MY} = Lm \times Dm \times Hm \times \frac{\rho ml}{386.4} \left( \frac{Lm^2 + Hm^2}{12} \right)}$$

Where $\rho ml$ = Density of Mirror in Lb/in$^3$
$I_{MY}$ = Moment of Inertia of Mirror about axis $YY$.
in lb. in. Sec$^2$
$I_M = M(FH + t + Hm/2)^2 + I_{MY}$ -continued $$I_M = Lm \times Dm \times Hm \times \frac{pml}{386.4} (FH + t + HM/2)^2 + I_{MY}$$

where $t$ = thickness of $S$ Flex Spring
$FH$ = flexmember height in inches.
$FH = (.707 (A + R + t/2) + R + t)$
where $R$ = inside bend radius of the $S$-Flex Spring
$\quad A = \frac{1}{2}$ straight portion of the spring
$\quad A = \frac{1}{2} (LF - 1.5 \pi \times R)$ where $LF = \dfrac{EF \times TET \times t}{2S}$ $EF$ = Modulus of elasticity of flex spring in lb/SQ" = $29.5 \times 10^6$ PSi $TET = TETO \times \dfrac{\pi}{180}$ $TETO$ = angle of oscillation in degrees.
$S$ = Flex spring endurance limit stress in lb./SQ".

Moment of Inertia of Mirror Structure including Magnets.
$Lm$ = Length of the magnet in inches.
$Rm$ = Radius of the magnet in inches.
$pmml$ = Density of mirror mount in lbs/in$^3$.
$plm$ = Density of the magnet in lb./in.$^3$
$Cm$ = Center distance of the magnet in inches.

Moment of Inertia of Mirror Mount about axis $y$—$y$ $$Immy = M_1 \left( \frac{Wlmm^2 + Tmm^2}{12} \right) +$$

$$M_2 \left( \frac{Wmm^2 + Tmm^2}{12} \right) + M_3(Cm^2 + Rm)^2$$

$$Immy = (Lmm - Llmm) \, Wlmm \times Tmm \times$$
$$\frac{pmml}{386.4} \left( \frac{Wlmm^2 + Tmm^2}{12} \right) +$$
$$Llmm \times Wmm \times Tmm \times \frac{pmml}{386.4} \left( \frac{Wmm^2 + Tmm^2}{12} \right) +$$
$$2 \left( \pi \times Rm^2 \times \frac{plm}{386.4} \times Lm \, (Cm^2 + Rm^2) \right)$$

Mass of the mirror mount with magnets.

$$M_1 + M_2 + M_3 = (Lmm - Llmm) \, Wlmm \times Tmm \times$$
$$\frac{pmml}{386.4} + Llmm \times Wmm \times Tmm \times \frac{pmml}{386.4} +$$
$$2\pi \times Rm^2 \times \frac{plm \times Lm}{386.4}.$$

Moment of Inertia of Mirror Structure with magnets about axis of rotation.

$$I_{MS} = (M_1 + M_2 + M_3)(FH + Tmm/2)^2 + Immy$$

Total — Moment of Inertia $I$ $$I = I_P + I_M + I_{MS}$$

Spring rate of $S$-flex Spring

-continued $$KF = \frac{EF \times w \times t^3}{EF \times 6}$$

$KF$ = Spring rate in lb. in/radian
$EF$ = Flex Spring Modulus of elasticity in psi.
$t$ = Thickness of flex spring in inches.
$w$ = Flex Spring width in inches
$LF$ = Length of flex spring in inches.

$$WR = \sqrt{\frac{2 \times KF}{I}}$$

$$FR = \frac{WR}{2\pi}$$

$FR$ = Resonant Frequency in Hertz ...

PREFERRED EMBODIMENT

In one preferred embodiment the S-flex spring was designed for a 625 Hertz resonant frequency with a angular displacement of 40 degrees peak to peak (called the optical displacement as opposed to the mechanical displacement that is ½ of the optical displacement). The calculations in the preceeding section are employed to determine an optimum configuration. Many different exchanges can be made between the weights of the mirror or the mirror attachment, the length and the materials of the spring and other stated variables. The optimization usually takes into prime consideration the available mirrors and the easily made spring blanks.

Figure 9:
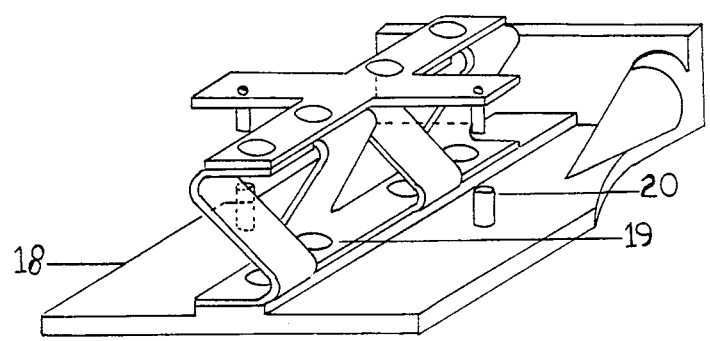
FIG. 9 shows the assembly in FIG. 7 mounted on a base (18) by means of rivets (19). There is a core pin of iron (20) used for mounting the driving coil.
Figure 10:
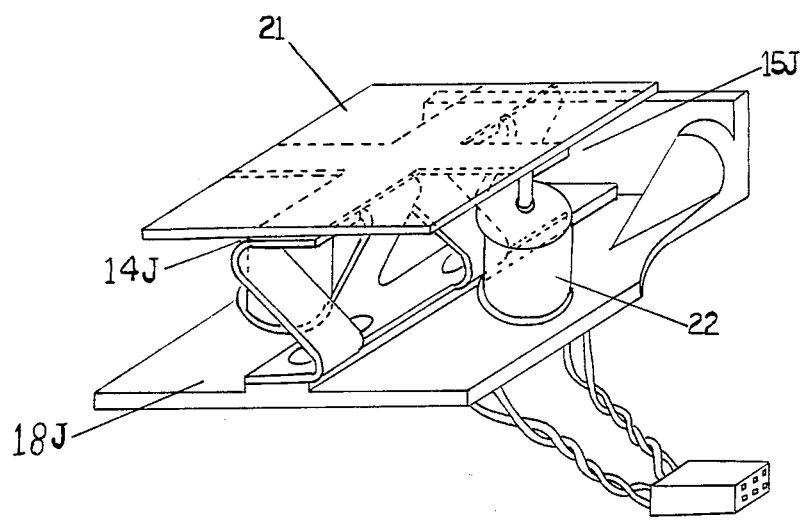
FIG. 10 shows the assembled scanner with a mirror (21) attached to the mirror attachment base as shown in FIG. 9 (14J, 15J) and coils (22) added which interact with the pins (16J) and are mounted on a base (18J).
Figure 11:
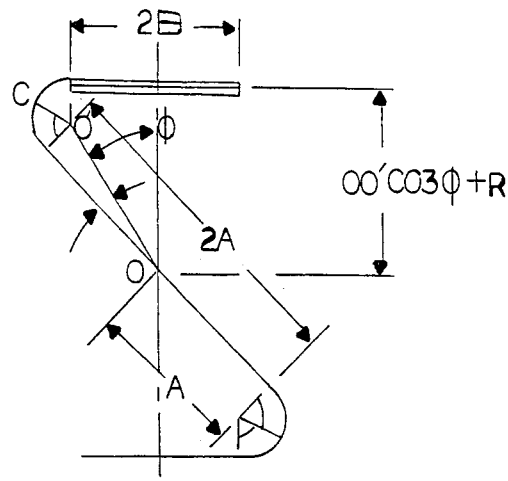
FIG. 11 shows a side view of the S-flex spring with the parts identified as used in the calculations in the text of the patant.

The calculations that follow are set to find the optimum spring design for a 40 degree optical displacement. A series of trial and error solutions are attempted to obtain the required resonant frequency with the final solution shown below. Some of the elements are fixed to a very few choices by the availability of materials. The mirror for example would be prohibitive in cost as a custom item so one of the generally available mirrors are used and in this case a 0.590 inch round mirror (Lm) instead of the rectangular mirror in the earlier calculations is used with a thickness of 0.059 inches (tm) and a density of 0.1 pounds per cubic inch (p). This mirror is available through several catalog suppliers. Fixing this, the mirror support and the magnets as well as the spring must be selected. Limits on the spring exist since some thicknesses are available and the material that has the best endurance limits is the most logical material. In our example a spring steel is selected with a modulus of elasticity of 29.5 million pounds per square inch and a thickness of 0.014 inches. The mirror support used is a production item that is made from aluminum in a cross shape. The arms of the cross are 2.71 inches long in the direction parallel to the axis of the rotation (Lmm) and 1.0 inches in the direction at right angles to that axis (Wm). The mirror support is 0.062 inches thick aluminum. The magnetic pins are 0.047 inches radius (Rm) and 0.25 inches long (W1mm). The calculations use the nomenclature in the FIG. 9 of the drawings for each element and follow the form of the preceeding calculations. The calculations thus are:

WORKED EXAMPLE OF URS SCANNER
GIVEN: Deflection = 40° peak to peak (optical)
$\quad$ For frequency = 625 Hz -continued $$LF = \frac{EF \times TET \times t}{2S} \text{ where}$$

$LF$ = effective Spring length in inches.

$TET = \frac{10 \times \pi}{180} = .1745$ radians =

$EF = 29.5 \times 10^6$ psi
$t = .014"$ = Spring thickness
Stress $S = 100000$ psi $$LF = \frac{29.5 \times 10^6 \times .1745 \times .014}{2 \times 100,000}$$

$\underline{LF = .360"}$
$A = \frac{1}{2}(LF - 1.5\pi \times R)$
$= \frac{1}{2}(.360 - 1.5 \times \pi \times 0.38)$
where $A = \frac{1}{2}$ Straight portion of spring in inches.
  $R$ = Effective bend radius in inches.
  $= .038"$
$\underline{A = .090"}$ $$W = \frac{KF \times LF \times 6}{EF \times t^3} \text{ where } \begin{array}{l} W = \text{Width of the Spring in inches} \\ KF = \text{Spring rate (assumed)} \\ = 23.1 \text{ Lb. in radians} \end{array}$$

$$= \frac{23.1 \times .360 \times 6}{29.5 \times 10^6 \times .014^3}$$

$\underline{W = .616"}$ $$FH = \left[.707\left(A + R + \frac{t}{2}\right) + R + t\right]$$

$$= \left[.707\left(.090 + .038 + \frac{.014}{2}\right) + .038 + .014\right]$$

$\underline{FH = .147"}$
$FH = \frac{1}{2}$ total Spring height in inches.
Moment of Inertia of the mirror about axis of rotation.

$$I_M = \frac{\pi d^2 tm \, \rho}{4g} \times \frac{d^2}{16} + \frac{\pi d^2 tm \, \rho}{4g}\left(FH + Tmm + \frac{tm}{2}\right)^2$$

Where
$d = .590"$ = Diameter of the mirror
$tm = .059"$ = Thickness of the mirror
$\rho = .1$ Lb/in$^3$ = Density of the mirror
$g = 386.4$ in/sec$^2$
$FH = .147"$
$Tmm = .062$ $$I_M = \frac{\pi \times .59^2 \times .059 \times .1}{4 \times 386.4} \times \frac{.59^2}{16} +$$

$$\frac{\pi \times .59^2 \times .039 \times .1}{4 \times 386.4}\left(.147 + .062 + \frac{.059}{2}\right)^2$$

$I_M = 1.312 \times 10^{-6}$ Lb. in. sec$^2$
Moment of Inertia of mirror structure with
magnet about axis of rotation.

$$I_{ms} = \left[(2.71 - .281).25 \times .062 \times \frac{.1}{386.4} + \right.$$

$$.281 \times 1.00 \times .062 \times \frac{.1}{386.4} +$$

$$\left. 2\pi \times .047^2 \times \frac{.28}{386.4} \times .25 \right]\left[.147 + \frac{.062}{2}\right]^2 +$$

-continued $$(2.71 - .281).25 \times .062 \times \frac{.1}{386.4}\left(\frac{.25^2 + .062^2}{12}\right) +$$

$$.281 \times 1.00 \times .062 \times \frac{.1}{386.4}\left(\frac{1.0^2 + .062^2}{12}\right) +$$

$$2\pi \times .047^2 \times \frac{.28}{386.4} \times .25 \,(.35^2 + .047^2)$$

Where
$Lmm = 2.71"$, $Llmm = .281"$, $Wlmm = .25"$, $Wm = 1.0"$ $Tmm = .062$, $\rho mml = \frac{.1}{386.4}$ $Rm = .047"$, $\rho lm = \frac{.28}{386.4}$ $Lm = .250"$, $FH = .147"$, $Cm = .35"$
$\underline{I_{ms} = 1.5432 \times 10^{-6} \text{ lb in Sec}^2.}$
Moment of Inertia of S-Flex Spring
$I_P = 4(I_{AO} + 2I_{CO} + 2I_{BO})$ $$I_{AO} = \frac{Wt\rho A^3}{3} = .616 \times .014 \times \frac{.28}{386.4} \times \frac{.090^3}{3} \text{ where}$$

$W = .616"$ $\rho = \frac{.28}{386.4}$ $t = .014"$
$A = .090"$
$I_{AO} = .00455 \times 10^{-6}$ Lb in sec$^2$
$I_{BO} = .417 \, Wt\rho B^3 + 2.5 \, Wt\rho B \,(OO'\cos\phi + R)^2$
Where
$W = .616$
$t = .014"$ $\rho = \frac{.28}{386.4}$ $OO' = \frac{A}{\cos\psi}$ and $\psi = \tan^{-1}\frac{R}{A}$ $R = .038"$
$A = .090"$
$\psi = 22.89°$
$\phi = 45 - 22.89$ $\quad B = OO' \sin\phi$
$\phi = 22.11°$ $\quad\quad\quad = .097 \sin 22.11°$
$\quad\quad\quad\quad\quad\quad\quad = .036"$ $OO' = \frac{.090}{\cos 22.89} = .097$ $I_{BO} = .417 \times .616 \times .014 \times \frac{.28}{386.4} \times .036^3 +$ $2.5 \times .616 \times .014 \times \frac{.28}{386.4} \times .036 \times (.097 \cos 22.11 + .038)^2$ $\underline{I_{BO} = .00931 \times 10^{-6} \text{ Lb. in. Sec}^2}$
$I_{CO} = .908 \, W\rho t R^3 + 2.356 \, W\rho R t \,(XGo^2 + YGo^2)$
Where $XGo = OO' \sin\phi + \frac{R \sin^2\theta}{\theta}$ and $YGo = OO' \cos\phi + \frac{R \sin\theta \cos\theta}{\theta}$ $\theta = 67.5°$ $XGo = .097 \sin 22.11 + \frac{.038 \times \sin^2 67.5}{67.5}$ $\underline{XGo = .0369}$ -continued $$YG_o = .097 \times \cos 22.11 + \frac{.038 \times \sin 67.5 \cos 67.5}{67.5}$$

$$\underline{YG_o = .09}$$

$$I_{CO} = .908 \times .616 \times \frac{.28}{386.4} \times .014 \times .038^3 +$$

$$2.356 \times .616 \times \frac{.28}{386.4} \times .038 \times .014 \times (.0369^2 + .09^2)$$

$$= .0056 \times 10^{-6} \text{ Lb in Sec}^2$$
$$I_P = 4(.00455 \times 10^{-6} + 2 \times .00931 \times 10^{-6} + 2 \times .0056 \times 10^{-6})$$
$$\underline{I_P = .1378 \times 10^{-6} \text{ Lb in. Sec}^2}$$
$$I = I_P + I_{ms} + I_m$$
$$= .1378 \times 10^{-6} + 1.5432 \times 10^{-6} + 1.312 \times 10^{-6}$$
$$\underline{I = 2.993 \times 10^{-6} \text{ Lb. in. Sec}^2}$$
$$KF = .23.1$$

$$WR = \sqrt{\frac{2KF}{I}}$$

$$= \sqrt{\frac{2 \times .23.1}{2.993 \times 10^{-6}}}$$

$$= 3.928 \times 10^3$$

$$fr = \frac{WR}{2\pi} = \frac{3.928 \times 10^3}{2\pi}$$

$fr = 625$ Hz
$fr =$ frequency in Hz

The manufacture of the scanner starts with the S-flex spring configuration. The preferred material for the spring is Carpenter Custom 455 steel as made by Carpenter Steel Co of Reading, PA. This steel is fully described in U.S. Pat. No. 3,408,178 and is selected for its very high endurance limit and its toughness. The spring blank as shown in the Drawings is made by electrochemical machining where the unwanted metal is etched away. This machining method results in a smooth edged blank which prevents any stress rising points and it is easy to include holes or other means to attach the S-flex to the base and the mirror support however the spring blanks. In this embodiment there are 4 holes along the connecting member and one hole machined in the tip of each spring member. The spring blank could also be punched from strip stock.

The spring is bent into the S shape manually with the help of a small jig to ensure a consistent shape or can be mass produced in future runs by bending dies.

Following the bending process the spring element is annealed to remove all residual stresses. The spring is solution ammealed by heating to 1500 degrees F then it is water quenched. The formed spring now is stress free and in the correct shape.

The spring is then hardened by a precipitation hardening treatment which requires the spring be brought to a temperature of 900 degrees F and held at that temperature for one half hour. Upon removal from the furnace the hardened spring is air cooled. The process literature by Carpenter Steel permits the hardening process to range from 900 to 1050 degrees F but best results are achived in a range of 900 to 925 degrees F. The steel of the S-Flex has a modulus of elasticity of 29,500,000 psi and an endurance limit of at least 110,000 psi as formed and hardened.

The other parts of the unit are machined or cast. The mirror attachment member is machined by conventional means from aluminum sheet. A type 3003-H14 aluminum is preferred due to the excellent strength. The part is made as shown in the drawings with 4 holes matching the spring holes in spacing on the spring attachment member while the cross member is fitted with two rod shape pins that are highly magnetized. These pins are pressed into the aluminum with a small hand press.

The base unit is cast aluminum of tye A356 aluminum alloy and is currently made by the lost wax method commonly used in manufacture of gold and silver ornaments. This part will eventually be die cast as the tooling is completed. The base has the holes for attachment of the connecting S-flex spring members in the base and for mounting the wire coils.

The spring is then attached to the base with four rivets.

The spring is then attached to the mirror attachment member with four rivets. These rivets are countersunk into the mirror attachment member to insure a smooth flat top to the unit where the mirror will be attached. Aluminum rivets are used for ease of handling, because they are light and to simplify the calculations since the holes can then be ignored in the calculations.

The mirror attachment is by means of an Epoxy polymeric glue that has high strength but is flexible. The epoxy must not cause distortion in the mirror for the optical quality of the mirror is such that any stress applied to the backing of the mirror can cause major errors in the mirror flatness.

The mirror is selected from front reflecting high optical quality mirrors such as those made from quartz glass with aluminum front surface coated with SiO2. Other reflective surfaces can be used to get high reflectivity for different wavelengths of radiation. Normally the mirror is optically flat to within one half wavelength although there are applications that require greater flatness. Great care is taken at this point to insure no slippage of the mirror that would unbalance the unit.

The assembly of the spring and the mirror is complete but there is no driver in the scanner. Two small coils are added, one to power the unit by the interaction of a high frequency variation in a magnetic field made by the energizing of the coil and the subsequent interaction between the coil and the magnetic pins at the ends of the cross member of the mirror attachment part. These coils are made by winding fine wire on plastic bobbins. The coils are pressed onto a soft iron pin which projects from the back of the base to which it is attached by a press fit and where the projection into the coils is no less than ⅓ of the coil height and no more than ⅔ of the coil height. The iron pin serves to enhance the effect of the magnetic field.

The second coil is identical to the first but, unlike the first coil which in use is energized to drive the scanner, it is not energized but is used to generate a current which is monitored by the driving electronics to provide a drive correction signal. The mounting of the second coil is similar to the mounting of the first coil.

The testing and adjusting proceedure is critical to the unit performance. The unit is attached to calibrated drive electronics and finr adjustment is made by changing the inertia of the moving member (the mirror, support, and the drive pins). This is done by addition or removal of small amounts of weights. A second adjustment emoplys the bending of tabs to add or to detract from the distance from the center of rotation of the weight of the tabs.

I claim:

1. A scanning deflector consisting of a mirror and deflecting means connected by top attaching means to one end of opposed curved springs that jointly provide torsional cross flex members which are in turn attached at the other end to a base by bottom attaching means.

2. Claim 1 where the top or bottom attaching means are selected from a group comprising adhesives, welds, rivets, screws and bolts.

3. Claim 1 where the shape of the spring is a Z where the flat top and bottom are the points of attachment.

4. Claim 1 where the shape of the spring is an S with the upper point of the S and the lower point of the s being the points of attachment.

5. Claim 1 where a multitude of s or Z shapes are formed into each of the opposing spring elements.

6. Claim 1 where the opposing springs are formed from one piece of metal.

7. Claim 1 where the ends of the S or Z shapes are formed into a loop permitting attachment by means of pins.

8. Claim 1 where the springs are bent shapes, one of each pair being a reverse shape, said shapes crossing each other in the area between the top and bottom attachment means.

9. A self resonant scanning device consisting of a mirror, a mirror attachment (jointly the mirror assembly) and a driving means which together comprise a deflector which, by attaching means, is fastened to opposed s or z shaped springs made from flat metal strip at a top point of the s or z and the said springs are attached to a base by second attaching means, the base containing means to deflect the mirror assembly through interaction with the driving means.

10. A self resonant scanner in claim 9 where the means to deflect the mirror assembly is an electrical coil which if excited by an alternating electrical current interacts with a magnetic pin, which is the said driving means, to cause motion.

11. The self resonant scanner in claim 10 where the power of the magnetic field of the electrical current is augmented by a soft iron pin located between ⅓ and ⅔ of the width of the coil and centrally to said coil with said pin having length projecting away from the direction of said mirror assembly.

12. The claim in 10 where the first attaching means are selected from a group comprising adhesives, welds, rivets, screws or bolts.

13. The claim in 10 where two or more sets of opposed springs are employed to add rigidity to the scanning device.

14. The claim in 10 where the driving means includes a second magnetic pin interacting with a second coil to provide a signal.

15. The claim in 9 where the attachment points are the flat top and bottom of the Z shape.

16. The claim in 9 where the springs are formed into shapes with a more than one S or Z shape and may have more than one point where the opposed shapes cross.

17. The claim in 9 where there is said driving means and a similar detecting coil attached to the mirror attachment.

18. The claim in 9 where the opposed spring elements are formed from a single piece of metal.

19. The claim in 9 where the s or Z shaped springs serve to dampen the resonant frequency curve thus causing a scanner with a wider resonant frequency range.

20. The claim in 19 where the means to deflect the mirror assembly is an electrical coil which when excited by an alternating current interacts with a magnet which is the said driving means to cause motion.

21. A self resonant scanner with a cross flexure spring assembly consisting of one or more pairs of opposed curved springs, the curve of which approximates as S or Z in shape and which cross each other between the tops of the shape and the bottoms of the shapes, said springs attached by an attaching means to a mirror assembly at one end and to a base at the other end and which is driven by a driving means, said springs providing a dampening effect on the resonance vs frequency curve and being capable of resonant frequencies between 75 and 750 hertz.

22. The claim in 21 where the driving means is the interaction between a magnet on one end and an electrical coil on the other end which is powered by an alternating electrical current.

23. The claim in 22 where the driving means includes alternating current controlled from the signal created by a second coil and a second magnet interacting.

24. The claim in 23 where the resonant frequency is between 275 and 700 hertz.

25. The claim in 21 where the resonant frequency is between 275 and 700 hertz.

* * * * *